(12) United States Patent
Kuroda

(10) Patent No.: US 11,179,992 B2
(45) Date of Patent: Nov. 23, 2021

(54) BALL JOINT MANUFACTURING METHOD AND STABILIZER LINK MANUFACTURING METHOD

(71) Applicant: NHK SPRING CO., LTD., Kanagawa (JP)

(72) Inventor: Shigeru Kuroda, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 45 days.

(21) Appl. No.: 16/497,988

(22) PCT Filed: Mar. 23, 2018

(86) PCT No.: PCT/JP2018/011746
§ 371 (c)(1),
(2) Date: Sep. 26, 2019

(87) PCT Pub. No.: WO2018/181010
PCT Pub. Date: Oct. 4, 2018

(65) Prior Publication Data
US 2020/0039317 A1    Feb. 6, 2020

(30) Foreign Application Priority Data
Mar. 31, 2017   (JP) .............................. JP2017-071678

(51) Int. Cl.
*B60G 21/055*     (2006.01)
*F16C 11/06*      (2006.01)

(52) U.S. Cl.
CPC ........ *B60G 21/055* (2013.01); *F16C 11/0685* (2013.01); *F16C 2220/06* (2013.01); *F16C 2326/05* (2013.01)

(58) Field of Classification Search
None
See application file for complete search history.

(56) References Cited

U.S. PATENT DOCUMENTS 2,095,416 A * 10/1937 Lefevre ..................... F16F 1/36
74/579 R
2,835,521 A *  5/1958 White .................. F16C 11/0633
403/139
(Continued)

FOREIGN PATENT DOCUMENTS

DE     102014225313 A1 *  6/2016  ............ F16C 17/243
DE     102016203470 A1 *  9/2017  ............ B60G 7/005
(Continued)

OTHER PUBLICATIONS

Machine Translation of WO 2012/133643 (Year: 2012).*
(Continued)

*Primary Examiner* — Jacob J Cigna
(74) *Attorney, Agent, or Firm* — Greenblum & Bernstein, P.L.C.

(57) ABSTRACT

The ball joint manufacturing method for manufacturing a ball joint including a ball stud which includes a substantially spherical metal ball section, and a resin housing rotatable accommodating the ball section of the ball stud, includes: a step of forming the housing to cover an outer periphery of the ball section; an induction heating step of subjecting the ball section to induction heating in a state in which the ball section is accommodated in an accommodation section of the housing until the temperature of the ball section reaches a predetermined target temperature; and a cooling step of cooling the ball section which has been subjected to the induction heating, wherein a torque adjustment step including the induction heating step and the cooling step is repeatedly performed.

4 Claims, 8 Drawing Sheets

(56) References Cited

U.S. PATENT DOCUMENTS

| | | | | |
|---|---|---|---|---|
| 3,945,739 | A * | 3/1976 | Abe | B60G 7/005 |
| | | | | 403/138 |
| 4,290,181 | A * | 9/1981 | Jackson | B29C 45/14754 |
| | | | | 264/242 |
| 5,427,467 | A * | 6/1995 | Sugiura | F16C 11/0638 |
| | | | | 403/133 |
| 5,660,097 | A * | 8/1997 | Nomura | F04B 27/1072 |
| | | | | 92/12.2 |
| 6,875,388 | B2 * | 4/2005 | Trotter | B29C 45/14065 |
| | | | | 264/234 |
| 8,281,490 | B2 * | 10/2012 | Nishide | F16C 23/043 |
| | | | | 29/898.049 |
| 8,651,852 | B2 * | 2/2014 | Kim | F16C 11/0657 |
| | | | | 425/451.7 |
| 2003/0086753 | A1 | 5/2003 | Trotter et al. | |
| 2006/0150416 | A1 | 7/2006 | Michioka et al. | |

FOREIGN PATENT DOCUMENTS

| | | | | |
|---|---|---|---|---|
| JP | 48026105 | B * | 8/1973 | |
| JP | 62-88815 | A | 4/1987 | |
| JP | 07190045 | A * | 7/1995 | |
| JP | 10151931 | A * | 6/1998 | B60G 21/0551 |
| JP | 2003-148447 | A | 5/2003 | |
| JP | 2004-316771 | A | 11/2004 | |
| JP | 2008-2601 | A | 1/2008 | |
| JP | 2011-247338 | A | 12/2011 | |
| JP | 2012-41013 | | 3/2012 | |
| WO | 2010/029847 | | 3/2010 | |
| WO | 2012/133643 | A1 | 10/2012 | |
| WO | WO-2012133643 | A1 * | 10/2012 | F16C 11/0685 |

OTHER PUBLICATIONS

Machine Translation of DE 10 2014 225 313 A1 (Year: 2016).*
Machine Translation of JP H 10151931 (Year: 1998).*
International Search report issued in International Bureau of WIPO Patent Application No. PCT/JP2018/011746, dated Jun. 19, 2018.
China Office Action issued in CN Application No. 201880019808.0, dated Apr. 6, 2021 and English language translation of the accompanying Search Report section.

* cited by examiner

BALL JOINT MANUFACTURING METHOD AND STABILIZER LINK MANUFACTURING METHOD

TECHNICAL FIELD

The present invention relates to a ball joint manufacturing method and a stabilizer link manufacturing method.

Priority is claimed on Japanese Patent Application No 2017-71678, filed Mar. 31, 2017, the content of which is incorporated herein by reference.

BACKGROUND

A vehicle includes a suspension device which absorbs and reduces shock and vibration transmitted from a road surface to a vehicle body through the wheels thereof and a stabilizer configured to enhance the roll rigidity of the vehicle body. In order to smoothly join a suspension device to a stabilizer, a rod-shaped member called a stabilizer link is used for a vehicle. For example, as described in Patent Document 1, a stabilizer link includes a support bar and ball joints provided at both end portions of the support bar.

The ball joint associated with Patent Document 1 is constituted of ball studs having ball sections, and housings provided at both ends of a support bar and configured to rotatably accommodate the ball sections of the ball studs. A resin ball seat is provided in a portion of each of the housings on an inner side thereof such that the ball seat is disposed between an inner wall of the housing and the ball section of the ball stud. An outer spherical surface of the ball section accommodated in the housing slides while in contact with an inner spherical surface of the ball seat. Thus, the ball stud can be tilted freely. In this way, the suspension device is smoothly joined to the stabilizer through the ball joint included in a stabilizer link.

According to the ball joint associated with Patent Document 1, since the resin ball seat is provided to be disposed between the inner wall of the housing and the ball section of the ball stud, it is possible to appropriately manage a torque related to the sliding of the ball section with respect to the housing.

DOCUMENT OF RELATED ART

Patent Document

[Patent Document 1] Japanese Unexamined Patent Application, First Publication No. 2011-247338

SUMMARY

Technical Problem

In the ball joint of the stabilizer link described in Patent Document 1, after the ball seat has been installed in the ball section of ball stud, the ball section having the ball seat installed therein is assembled in the housing. To be specific, when the ball stud having the ball seat installed in the hall section is inserted into a mold as a core, a cavity is formed therein, and injection molding in which a resin is injected into this cavity is performed. At this time, the tightening allowance for the ball section is set to an appropriate value by setting a clearance between the ball section and the ball seat to a predetermined value and performing injection molding by appropriately controlling injection conditions of the resin.

However, in the tightening torque management technology of e housing acting on the ball section described in Patent Document 1, since the ball section is tightened due to the shrinkage of the resin material which forms the housing after the injection molding, it may be difficult to ensure the clearance accuracy between the ball section and the ball seat. For this reason, it may be difficult to accurately perform the tightening torque management of the housing acting on the ball section.

The present invention is made in view of the above-mentioned circumstances, and an object of the present invention is to provide a ball joint manufacturing method and a stabilizer link manufacturing method capable of accurately performing tightening torque management of a housing acting on a ball section without using a ball seat.

Solution to Problem

In order to accomplish the above-described object, a ball joint manufacturing method according to a first aspect of the present invention is a ball joint manufacturing method for manufacturing a ball joint including a ball stud in which a substantially spherical metal ball section is provided at an end portion of a stud section and a resin housing which includes an accommodation section rotatably accommodating the ball section of the ball stud, including: a step of forming the housing to cover an outer periphery of the ball section by forming a cavity by inserting the ball section of the ball stud into a mold as a core and by performing injection molding by injecting a resin into the cavity in the mold; an induction heating step of subjecting the ball section to induction heating until a temperature of the ball section reaches a predetermined target temperature within a range which exceeds a glass transition point of a resin material constituting the housing but does not exceed a melting point thereof in a state in which the ball section is accommodated in the accommodation section of the housing; and a cooling step of cooling the ball section which has been subjected to the induction heating until the temperature of the ball section reaches at least a temperature of the glass the induction heating step and the cooling step is repeatedly performed.

In the ball joint manufacturing method according to the first aspect of the present invention, in the induction heating step, the ball section is subjected to the induction heating until the temperature of the ball section reaches a predetermined target temperature within the range which exceeds the glass transition point of the resin material constituting the housing but does not exceed the melting point thereof in a state in which the ball section is accommodated in the accommodation section of the housing. This induction heating causes the metal ball section to expand. When the ball section expands, the inner spherical surface of the accommodation section of the resin housing also expands and deforms. The expansion and deformation of the inner spherical surface of the accommodation section of the housing is performed under a predetermined target temperature within the range which exceeds the glass transition point of the resin material constituting the housing but does not exceed the melting point thereof. For this reason, expansion and deformation based on plastic deformation and elastic deformation occurs in the resin material to be formed into the housing. On the other hand, in the cooling step, the ball section which has been subjected to the induction heating is cooled until the temperature thereof reaches at least a temperature equal to or less than the glass transition point of the resin material. Due to this cooling, the expanded ball section returns to a size before expansion. Here, in the expansion and deformation of the inner spherical surface of the accommodation section of the housing, an amount corresponding to the elastic deformation is restored, but an amount corresponding to the plastic deformation is maintained as it is. As a result, a gap based on the amount corresponding to the plastic deformation is formed between the ball section of the ball stud and the inner spherical surface of the accommodation section of the housing. According to the inventors' research, it turned out that, when the torque adjustment step including the induction heating step and the cooling step is repeatedly performed, in the expansion and deformation of the inner spherical surface of the accommodation section of the housing, the amount corresponding to the plastic deformation tends to converge to a value unique to the resin material which forms the ho that, if the number of repetitions of the torque adjustment step is set to an appropriate value, it is possible to accurately perform the tightening torque management of the housing acting on the ball section.

According to the ball joint manufacturing method associated with the first aspect of the present invention, it is possible to accurately perform the tightening torque management of the housing acting on the ball section without using a ball seat.

Further, a stabilizer link manufacturing method according to a second aspect of the present invention is a stabilizer link manufacturing method for manufacturing a stabilizer link in which a ball joint is provided at each of both ends of a support bar, including: a step of manufacturing the ball joint using the ball joint manufacturing method according to the first aspect of the present invention; and a step of providing the ball joint at each of both ends of the support bar.

According to the stabilizer link manufacturing method associated with the second aspect of the present invention, similar to the ball joint manufacturing method according to the first aspect of the present invention, it is possible to accurately perform the tightening torque management of the housing acting on the ball section without using a ball seat.

Effects

According to the present invention, it is possible to accurately perform tightening torque management of a housing acting on a ball section without using a ball seat.

DESCRIPTION OF EMBODIMENTS

A ball joint manufacturing method and a stabilizer link manufacturing method according to an embodiment of the present invention will be described in detail below with reference to the drawings as appropriate. Note that a method for manufacturing a stabilizer link 11 according to the embodiment of the present invention includes a concept including a method for manufacturing a ball joint 13 according to the embodiment of the present invention. For this reason, when the method for manufacturing the stabilizer link 11 according to the embodiment of the present invention is described, the method for manufacturing the ball joint 13 according to the embodiment of the present invention will also be described at the same time.

<Stabilizer Link 11>

Figure 1:
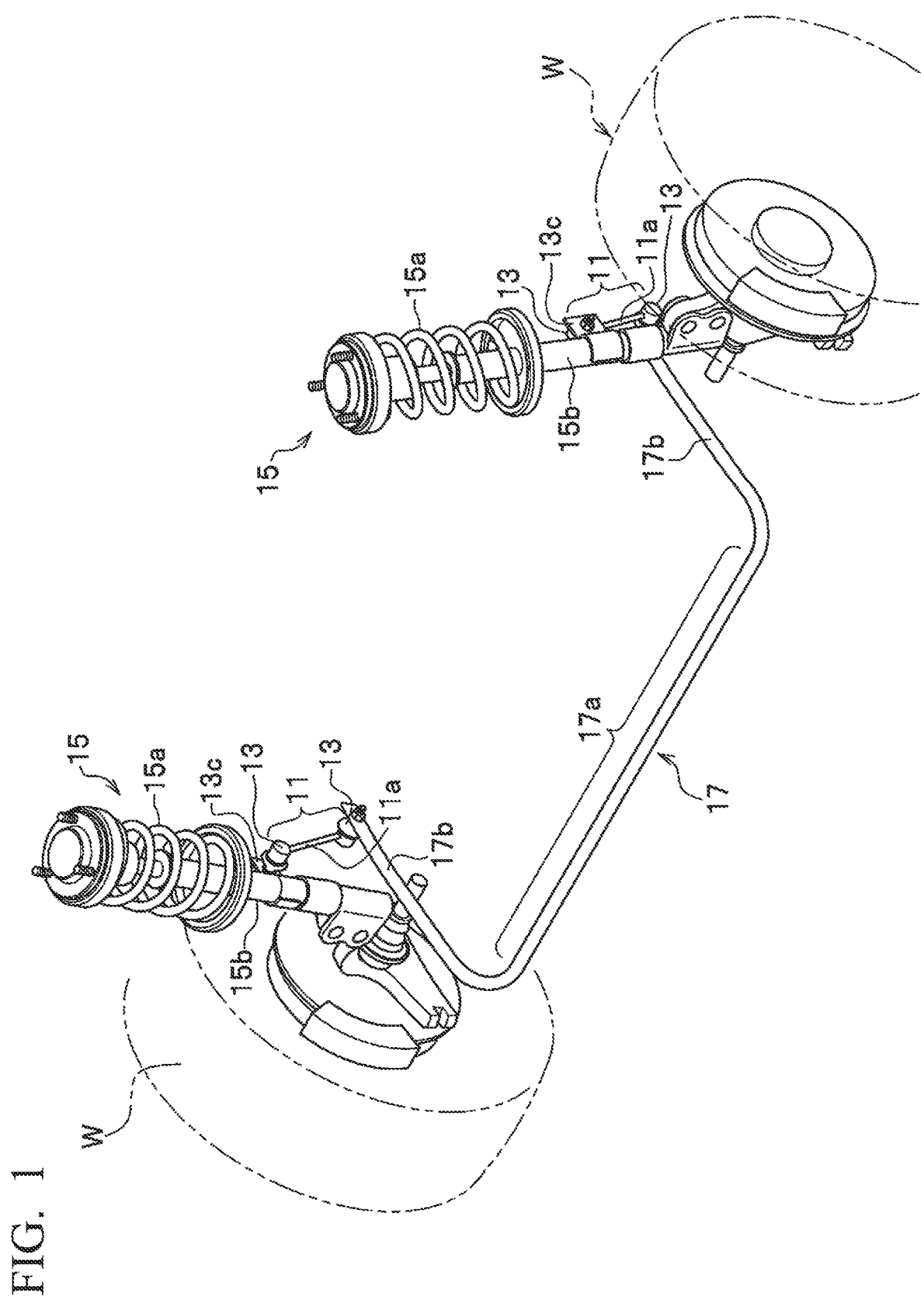
FIG. 1 is a perspective view illustrating a state in which a stabilizer link manufactured using a stabilizer link manufacturing method according to an embodiment of the present invention is attached to a vehicle.

First, the stabilizer link 11 manufactured using the manufacturing method associated with the embodiment of the present invention will be described using an example in which the stabilizer link 11 is attached to a vehicle (not shown). FIG. 1 is a perspective view illustrating a state in which the stabilizer link 11 is attached to the vehicle.

As illustrated in FIG. 1, wheels W are attached to a vehicle body (not shown) of the vehicle with suspension devices 15 therebetween. In order to absorb and reduce shock and vibration transmitted from a road surface to the vehicle body through the wheels W, each of the suspension devices 15 includes a coil spring 15a and a shock absorber 15b.

The left and right the suspension devices 15 are joined to each other with a stabilizer 17 formed of a substantially U-shaped spring steel rod or the like therebetween. In order to increase the roll rigidity of the vehicle body (a resistance force against torsional deformation) and minimize the rolling of the vehicle, the stabilizer 17 includes a torsion bar 17a extending between the left and right wheels W and a pair of arm sections 17b bent and extending from both end portions of the torsion bar 17a. The suspension devices 15 and the stabilizer 17 correspond to a "structure" of the present invention to which a stud section 21a which will be described later is joined.

The stabilizer 17 is joined to the shock absorber 15b which supports the wheels W with the stabilizer link 11 therebetween. The joining is the same on the left and right wheels W side. As illustrated in FIG. 1, the stabilizer link 11 is configured by providing ball joints 13 at both end portions of a rod-like support bar 11a formed of, for example, a steel pipe. A distal end portion 11a1 of the support bar 11a (refer to FIG. 2) plastically deforms into a flat plate shape through pressing.

The stabilizer link 11 is manufactured using an insert injection molding process in which a synthetic resin which forms housings 23 is injected into the mold in a state in which the support bar 11a and a ball stud 21 have been inserted into predetermined positions in a mold (not shown). This will be described in detail later. It should be noted that, in the following description, when the "term injection molding process" is used, the insert injection molding process refers to the above-mentioned process.

One ball joint 13 of the pair of ball joints 13 included in the stabilizer link 11 is tightened and fixed to a distal end portion of one of the arm sections 17b of the stabilizer 17 and the other the ball joint 13 is tightened and fixed to a bracket 13c of the shock absorber 15b. It should be noted that, although the pair of ball joints 13 in this embodiment have the same configuration, the pair of ball joints may have different configurations.

<Ball Joint 13>

Figure 2:
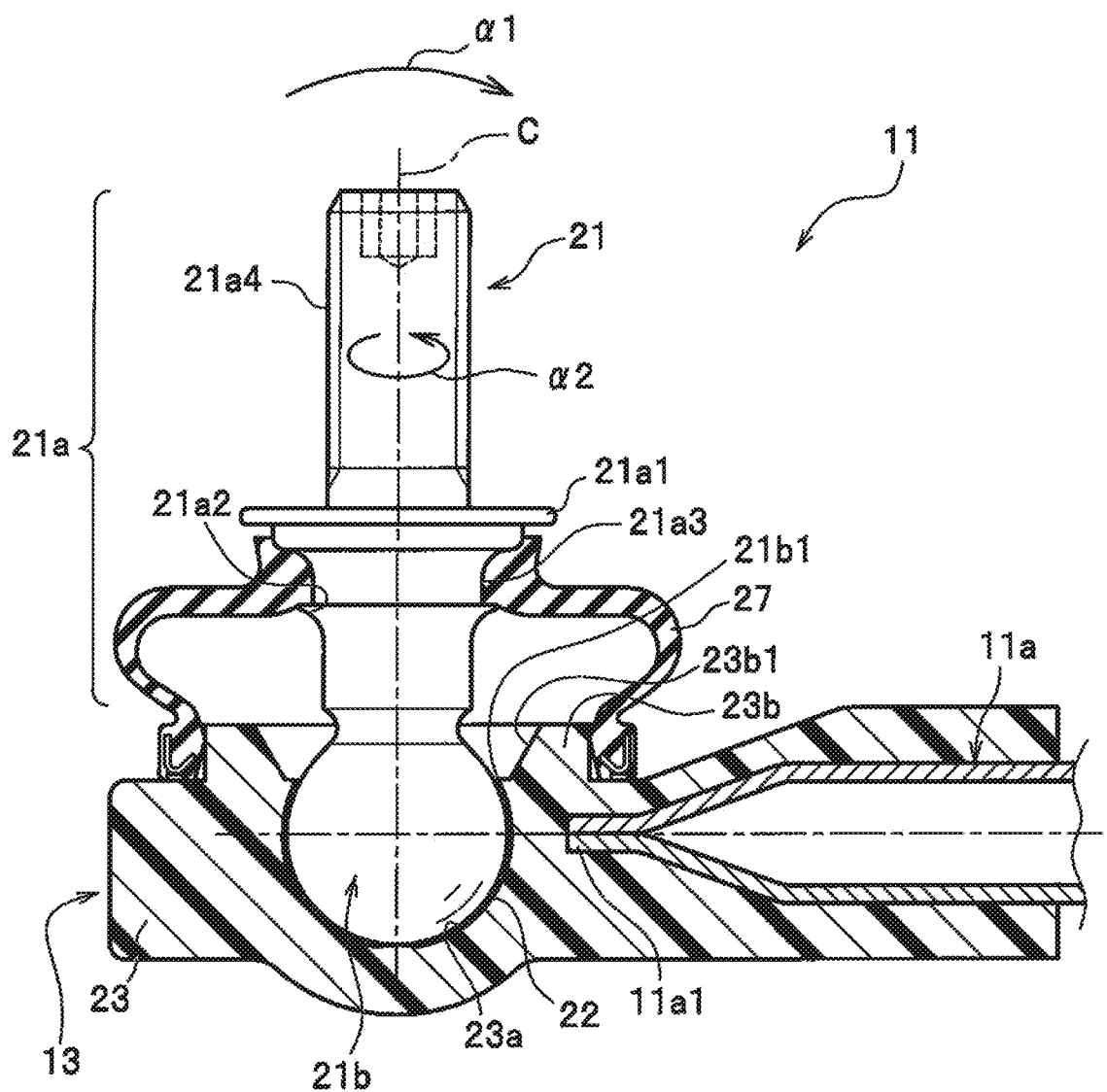
FIG. 2 is a longitudinal cross-sectional view of a ball joint manufactured using the ball joint manufacturing method according to the embodiment of the present invention.

The ball joint 13 will be described below with reference to FIG. 2. FIG. 2 is a longitudinal cross-sectional view of the ball joint 13 manufactured using the manufacturing method associated with the embodiment of the present invention.

As illustrated in FIG. 2, the ball joint 13 is constituted of the ball stud 21 made of a metal such as steel and each of the housings 23 made of a synthetic resin. The ball stud 21 is a shaft member extending in one direction and is configured to have one end portion having the stud section 21a and the other end portion having a substantially spherical ball section 21b. The ball section 21b is provided at an end portion of the stud section 21a. The ball section 21b is made of a metal such as steel. The stud section 21a is joined to the ball section 21b through welding. The stud section 21a may be integrally formed with the ball section 21b. The housings 23 are provided at both ends of the support bar 11a and the housings 23 is configured to rotatably support the ball section 21b of the ball stud 21.

The longitudinal cross-sectional view of the ball joint in this embodiment is a cross-sectional view along a central axis C (an axis) of the ball stud 21. In other words, the longitudinal cross-sectional view is a cross-sectional view including both the axis C of the ball stud 21 and a central axis of the support bar 11a. In the stabilizer link and the ball joint in this embodiment, a side on which the stud section 21a is provided may be referred to as an upper side and a side on which the ball section 21b is provided may be referred to as a lower side (or a bottom portion side) in some cases.

A large collar section 21a1 and a small collar section 21a2 are formed on the stud section 21a of the ball stud 21 to be separated from each other. A circumferential concave section 21a3 is formed between the large collar section 21a1 and the small collar section 21a2. A male screw section 21a4 is provided in the stud section 21a on a distal end side relative to the large collar section 21a1 (a side of the ball stud 21 opposite from the ball section 21b).

A circumferential dust cover 27 made of an elastic material such as rubber is installed between an upper end portion of the housing 23 and the circumferential concave section 21a3 of the stud section 21a to cover a gap therebetween. The dust cover 27 prevents rainwater, dust, and the like from entering the ball joint 13.

In order to rotatably support the ball section 21b of the ball stud 21, as illustrated in FIG. 2, an accommodation section 23a having an inner spherical surface corresponding to an outer spherical surface of the ball section 21b is formed in the housing 23. A substantially annular convex flange 23b is formed on an upper portion of the housing 23. The convex flange 23b includes a conical tapered section 23b1 extending outward and upward from a boundary section 21b1 in which the ball section 21b is annularly exposed with respect to the accommodation section 23a. An inclination angle of the tapered section 23b1 with respect to the axis C is set to an appropriate value in accordance with a swing angle, a shaft diameter, and the like of the ball stud 21.

Examples of a resin material of the housing 23 include PA66-GF30 (obtained by mixing 30% by weight of glass fibers with PA66/melting point: about 270° C.) in consideration of having thermoplasticity (to form the housing using injection molding), meeting predetermined strength requirements, and the like. Here, as the resin material of the housing 23, materials such as engineering plastics such as PA66-GF50 (obtained by mixing 50% by weight of glass fibers with PA66), polyetheretherketone (PEEK), Polyamide 66 (PA66), polyphenylene sulfide resins (PPS), and polyoxymethylene (POM), super engineering plastics, fiber reinforced plastics (FRPs), glass reinforced plastics (GRPs: glass fiber reinforced plastics), and carbon fiber reinforced plastics (CFRP) can be appropriately used in addition to PA66-GF30.

As illustrated in FIG. 2, a slight gap 22 is provided between the ball section 21b of the ball stud 21 and the accommodation section 23a of the housing 23 (hereinafter the "accommodation section 23a in the housing 23" may be abbreviated as a "housing accommodation section 23a" in some cases). When an outer spherical surface of the ball section 21b accommodated in the accommodation section 23a of the housing 23 slides while in contact with an inner spherical surface of the accommodation section 23a via the slight gap 22, the ball stud 21 is supported with respect to the housing 23 to be swingable (refer to an arrow α1 in FIG. 1) and rotatable (refer to an arrow α2 in FIG. 1). In this way, the suspension devices 15 are smoothly joined to the stabilizer 17 using the ball joint 13 provided in the stabilizer link 11.

As illustrated in FIG. 2, the housing 23 has a thick thickness to reliably support the ball section 21b. For this reason, an amount of shrinkage of the housing 23 which has been subjected to the insert injection molding is likely to increase. Due to the shrinkage of the housing 23, the ball section 21b is tightened inward due to the housing accommodation section 23a. In order to accurately perform this tightening torque management, torque adjustment which will be described later is performed. It should be noted that the torque adjustment mentioned in the embodiment of the present invention includes a concept in which adjustment of a swing torque and a rotating torque of the ball stud 21 and an amount of elastic lift is comprehensively included.

<Frequency Induction Heating Device 31>

Figure 3:
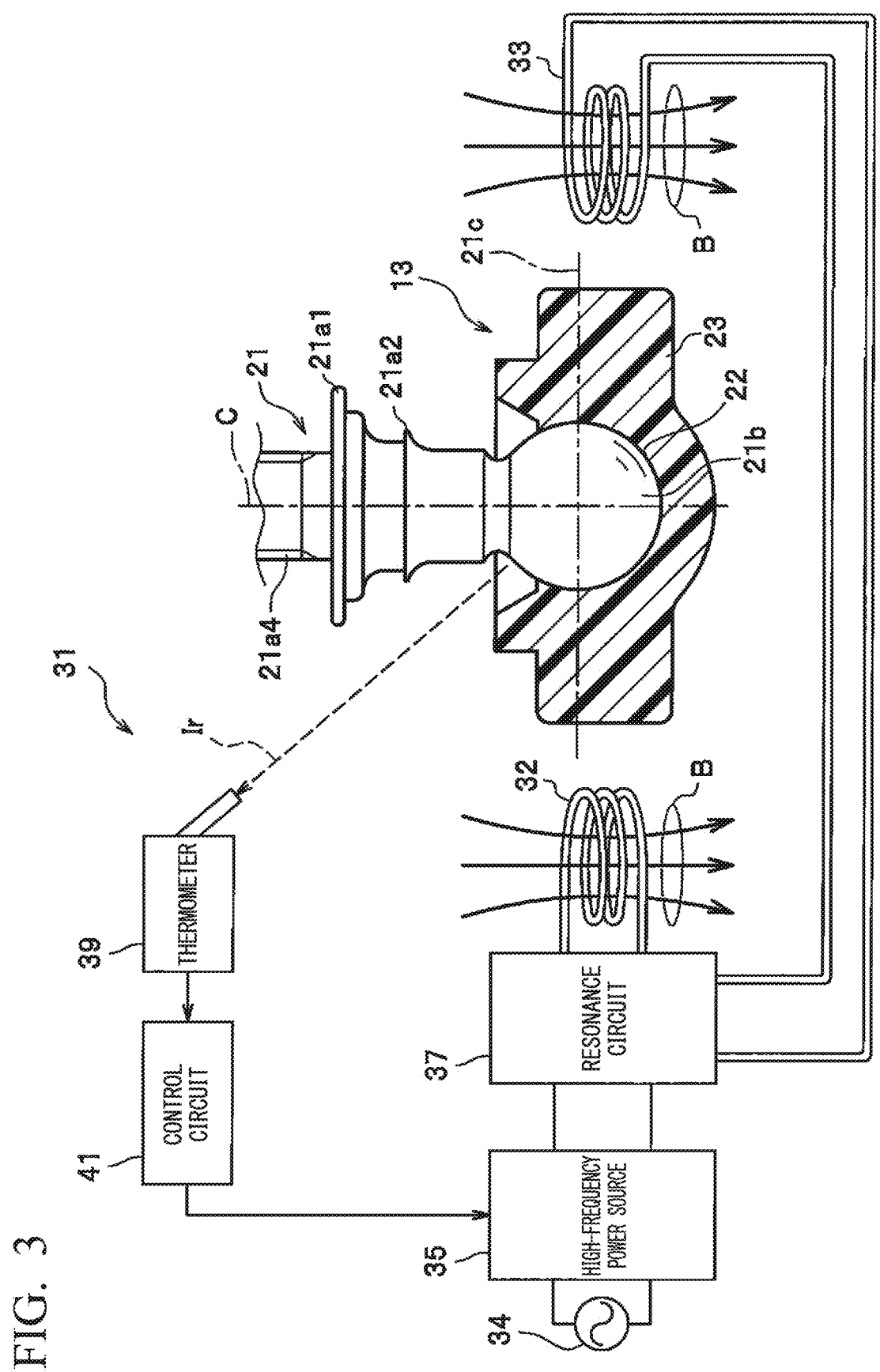
FIG. 3 is a configuration diagram conceptually illustrating a state in which tightening torque management of a housing acting on a ball section is performed using a high-frequency induction heating device.
Figure 4:
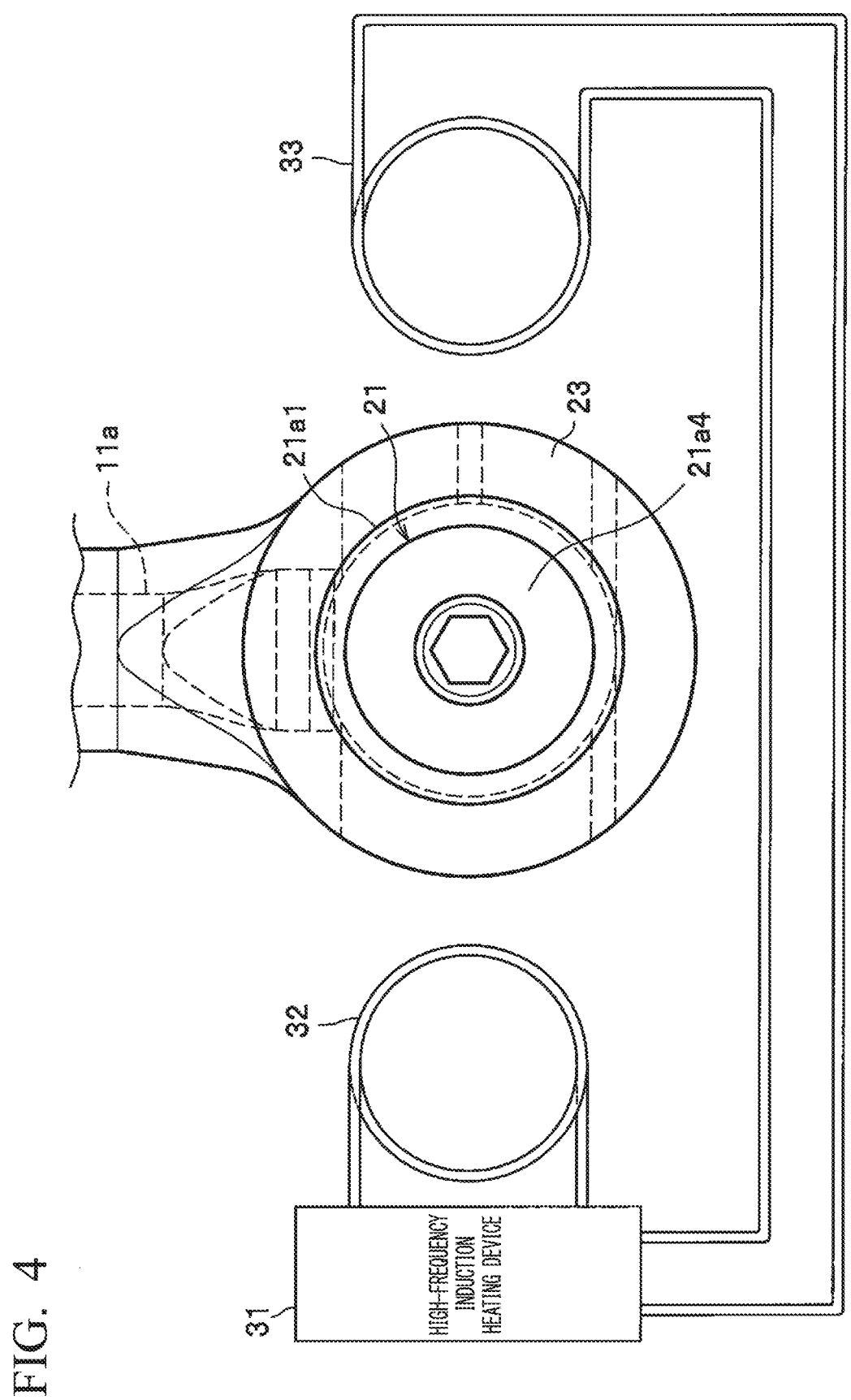
FIG. 4 is a plan view of the configuration diagram illustrated in FIG. 3.

A high-frequency induction heating device 31 used in the method for manufacturing the stabilizer link 11 according to the embodiment of the present invention will be described below with reference to FIGS. 3 and 4. FIG. 3 is a configuration diagram conceptually illustrating a state in which tightening torque management of the housing 23 with respect to the ball section 21b is performed using the high-frequency induction heating device 31. FIG. 4 is a top view (a plan view) of the configuration diagram illustrated in FIG. 3.

As illustrated in FIG. 3, the high-frequency induction heating device 31 includes coils 32 and 33, a high-frequency power source 35 connected to an alternating current (AC) power source 34, a resonance circuit 37, a thermometer 39, and a control circuit 41. The high-frequency induction heating device 31 can subject the metal ball section 21b to induction heating by flowing a high frequency current through the coils 32 and 33.

As illustrated in FIG. 3, the coils 32 and 33 are disposed at intervals with respect to metal members such as the support bar 11a and the ball joint 13 to surround an equator section 21e of the ball section 21b in the ball stud 21. A mechanism (not shown) for water cooling and/or air cooling is appropriately applied to the coils 32 and 33 to prevent damage due self-heating. The equator section 21c is a portion of an outer surface of the ball section 21b farthest in a radial direction orthogonal to the axis C from the axis C of the ball stud 21.

The high-frequency power source 35 converts AC electric power supplied from the AC power source 34 into high frequency electric power having a predetermined frequency and supplies the converted high frequency electric power to the resonance circuit 37.

The resonance circuit 37 is, for example, an LC parallel resonance circuit constituted of a capacitor (not shown) and the coils 32 and 33. The resonance circuit 37 accumulates AC electric power amplified using a resonance action to be set appropriately in the capacitor and allows a high frequency current to flow through the coils 32 and 33. This high frequency current generates a strong magnetic field B in the coils 32 and 33. Due to the action of this magnetic field B, an eddy current is induced in the metal ball section 21b. As a result, the ball section 21b is subjected to induction heat The thermometer 39 has a function of measuring a temperature Tb of the ball section 21b. Examples of the thermometer 39 include a radiation thermometer. The thermometer 39 acquires the temperature Tb of the ball section 21b by measuring the intensity of infrared rays entitled from the ball section 22b in a non-contact manner and converting the intensity of infrared rays into a temperature. The temperature Tb of the ball section 21b acquired using the thermometer 39 is transmitted to the control circuit 41.

The control circuit 41 controls the strength of the magnetic field B acting on the ball section 21b such that the temperature Tb of the ball section 21b acquired using the thermometer 39 is maintained at a preset target temperature Ttg. As the target temperature Ttg, a temperature within a range which exceeds a glass transition point of a resin material which forms the housing 23 but does not exceed a melting point thereof may be appropriately adopted. To be specific, a temperature in the above temperature range close to the melting point may be set as the target temperature Ttg. In this case, torque management a desired accuracy can be obtained with a relatively small number of repetitions. By performing such temperature control, the temperature Tb of the ball section 21b is maintained at the target temperature Ttg in an induction heating step of subjecting the ball section 21b to induction heating which will be described later.

<Method for Manufacturing Stabilizer Link 11 According to Embodiment of Present Inventions>

Figure 5:
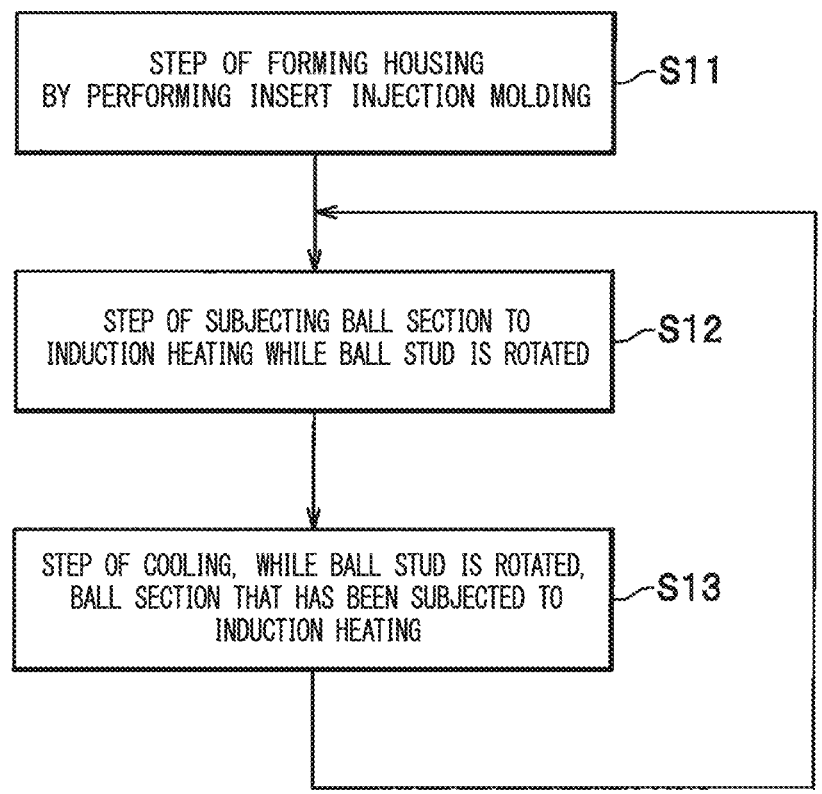
FIG. 5 is a process diagram for describing a procedure of the stabilizer link manufacturing method according to the embodiment of the present invention.

A method for manufacturing the stabilizer link 11 according to the embodiment of the present invention will be described below with reference FIG. 5. FIG. 5 is a process diagram for describing a procedure of the method for manufacturing the stabilizer link 11 according to the embodiment of the present invention.

In Step S11 illustrated in FIG. 5, the housing 23 is formed to cover an outer periphery of the ball section 21b by forming a cavity by inserting the support bar 11a and the ball section 21b of the ball stud 21 into the mold as a core, and by performing injection molding by injecting, for example, a synthetic resin such as PA66-GF30 into the cavity in the mold. It should be noted that this step corresponds to a step of providing the ball joints at both ends of the support bar 11a. It should be noted that, after the ball joints 13 are manufactured, the manufactured ball joints 13 may be joined to both ends of the support bar 11a.

In Step S12, in a state in which the ball section 21b is accommodated in the housing accommodation section 23a, the ball section 21b is subjected to induction heating until the temperature of the ball section 21b reaches the target temperature Ttg within a range which exceeds the glass transition point (about 50° C. for PA66-GF30) of the resin material (PA66-GF30) constituting the housing 23 but does not exceed the melting point (about 265° C. for PA66-GF30) thereof. The induction heating step in Step S12 is performed while the ball stud 21 is caused to be rotated around the axis C of the ball stud 21. A rotational speed of the ball stud 21 may be set to an appropriate speed in consideration of a surface temperature of an outer spherical surface of the ball section 21b being uniformized.

In Step S13, the ball section 21b which has been subjected to the induction heating in Step S12 is cooled until the temperature of the ball section 21b reaches at least a temperature of the glass transition point (about 50° C. for PA66-GF30) or less of the resin material (PA66-GF30). The cooling step in Step S13 is performed the ball stud 21 is caused to be rotated around the axis C of the ball stud 21. The rotational speed of the ball stud 21 may be set to an appropriate speed in consideration of the surface temperature of the outer spherical surface in the ball section 21b being uniformized.

After that, the torque adjustment step including the induction heating step in Step S12 and the cooling step in Step S13 is repeatedly performed a predetermined number of times (a plurality of number of times), thereby adjusting a tightening torque of the housing 23 with respect to the ball section 21b. Thus, the process for manufacturing the ball joint 13 is completed.

The metal ball section 21b is heated and expands through the induction heating step in Step S12. When this ball section 21b expands, the inner spherical surface of the resin housing accommodation section 23a also expands and deforms. The inner spherical surface of this housing accommodation section 23a expands and deforms at the target temperature Ttg within a range which exceeds the glass transition point of the resin material which forms the housing 23 but does not exceed the melting point thereof. For this reason, the resin material which forms the housing 23 expands and deforms on the basis of plastic deformation and elastic deformation. It should be noted that it is conceivable that the resin material plastically deforms along with the crystallization of the resin material.

In the cooling step in Step S13, the ball section 21b which has been subjected to the induction heating in Step S12 is cooled until the temperature thereof reaches at least a temperature of the glass transition point or less of the resin material. Through this cooling, the ball section 21b which has expanded returns to a size thereof before expansion. Here, in the expansion and deformation of the inner spherical surface in the housing accommodation section 23a, an amount corresponding to elastic deformation thereof is restored, but an amount corresponding to plastic deformation is maintained as it is. As a result, a gap 22 (refer to FIG. 2) based on the amount corresponding to the plastic deformation is formed between the ball section 21b of the ball stud 21 and the inner spherical surface of the housing accommodation section 23a. A size of the gap 22 substantially defines the tightening torque of the housing 23 with respect to the ball section 21b.

Figure 6:
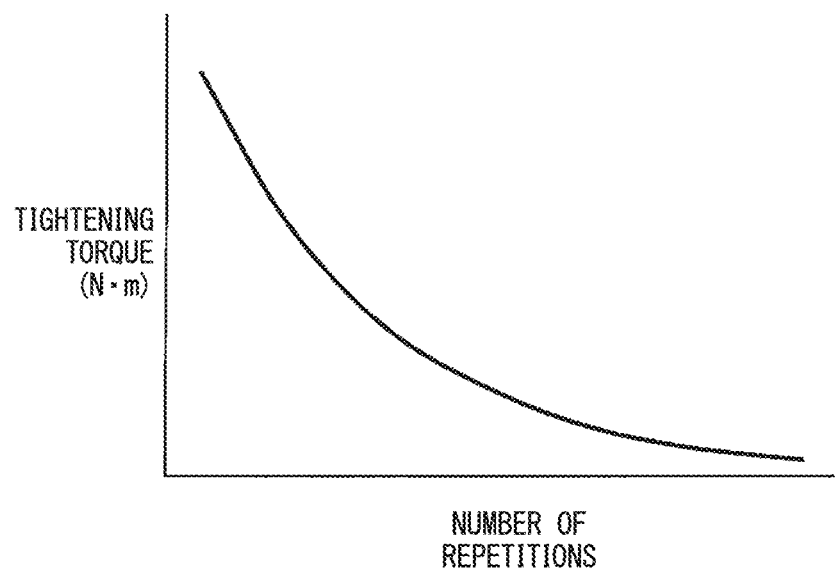
FIG. 6 is a characteristic diagram for describing a tightening torque of the housing acting on the ball section with respect to a change in the number of repetitions of a torque adjustment step including an induction heating step and a cooling step.

According to the present inventors' research, it can be seen that, when the torque adjustment step including the induction heating step in Step S12 and the cooling step in Step S13 is repeatedly performed, the amount corresponding to the plastic deformation in the expansion and deformation of the inner spherical surface of the housing accommodation section 23a converges to a value unique to the resin material which forms the housing 23, and other words, the tightening torque of the housing 23 with respect to the ball section 21b converges to a predetermined value (refer to FIG. 6). This means that, if the number of repetitions of the torque adjustment step including the induction heating step in Step S12 and the cooling step in Step S13 is set to an appropriate value (here, the number of repetitions is the plurality of number of times is possible to accurately perform the tightening torque management of the housing 23 with respect to the ball section 21b.

According to the method for manufacturing the ball joint 13 associated with the embodiment of the present invention, it is possible to accurately perform the tightening torque management of the housing 23 with respect to the ball section 21b without using a ball seat.

Also, in the method for manufacturing the ball joint 13 according to the embodiment of the present invention, a configuration in which the tightening torque of the housing 23 with respect to the ball section 21b is adjusted by increasing or decreasing the number of repetitions of the torque adjustment step may be adopted. With such a configuration, it is possible to accurately perform the tightening torque management using a simple and practical means.

Furthermore, in the method for manufacturing the ball joint 13 according to the embodiment of the present invention, in the torque adjustment step, a configuration in which the tightening torque of the housing 23 with respect to the ball section 21b is adjusted by rotating the ball stud 21 around the axis C and increasing or decreasing the rotational speed of the ball stud 21 in a range below an upper limit rotational speed set on the basis of a limit PV value of the resin n material of the housing 23 may be adopted. It should be noted that a PV value is a function of a product of a load pressure (P) and a sliding speed (V). The limit PV value is a PV value which is a limit when sliding surface of a material deforms and is melted due to frictional heat generation. Under conditions in which a PV value exceeds the limit. PV value, generally, both friction and wear significantly increases, and a configuration with such a PV value cannot be used. The limit PV value increases when the heat resistance of the resin increases. Actually, the load pressure (P) and the sliding speed (V) of the resin material are set in consideration that the PV value is about half of the limit PV value.

According to the method for manufacturing the ball joint 13 associated with the embodiment of the present invention, in the torque adjustment step, since the tightening torque of the housing 23 with respect to the ball section 21b is adjusted by increasing or decreasing the rotational speed of the ball stud 21 in the range below the upper limit rotational speed set on the basis of the limit PV value of the resin material of the housing 23, the surface temperature of the outer spherical surface in the ball section 21b is uniformized and the processing, accuracy of the inner spherical surface of the housing accommodation section 23a is improved. As a result, it is possible to more accurately perform the tightening torque management using a simple and practical means.

Figure 7A:
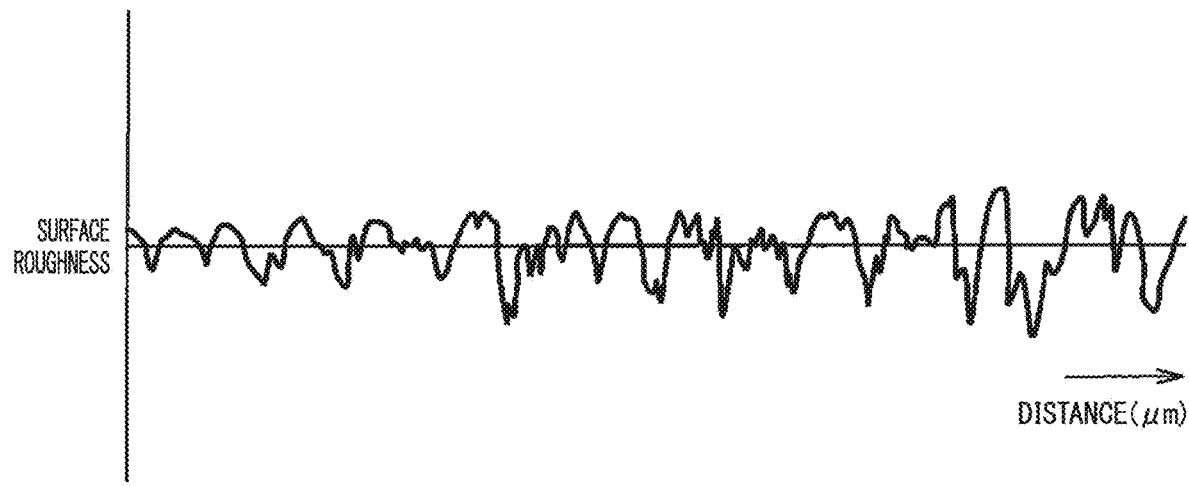
FIG. 7A is a diagram for describing a surface roughness of an inner spherical surface of an accommodation section in the housing when the torque adjustment step including the induction heating step and the cooling step is performed a single number of times (a comparative example).
Figure 7B:
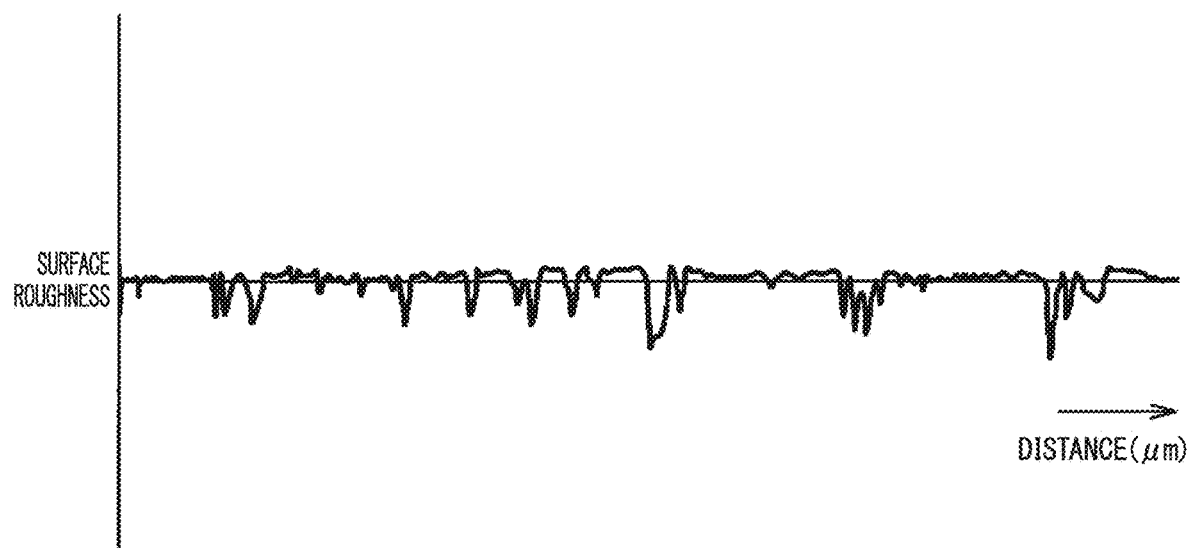
FIG. 7B is a diagram for describing a surface roughness of an inner spherical surface of the accommodation section in the housing when the torque adjustment step including the induction heating step and the cooling step is repeatedly performed (a practical example).

Here, when the surface roughness of the inner spherical surface of the housing accommodation section 23a (refer to FIG. 7A) when the torque adjustment step is performed a single number of times (the comparative example) is compared to the surface roughness of the inner spherical surface of the housing accommodation section 23a (refer to FIG. 7B) when the torque adjustment step is repeatedly performed (here, the number of repetitions is 3) (the practical example), it can be seen that the surface (the inner spherical surface of the housing accommodation section 23a) of the practical example (the plurality of number of times) is more smoothed (that is, the coefficient of friction decreases) than that in the comparative example (the single number of times).

Figure 8A:
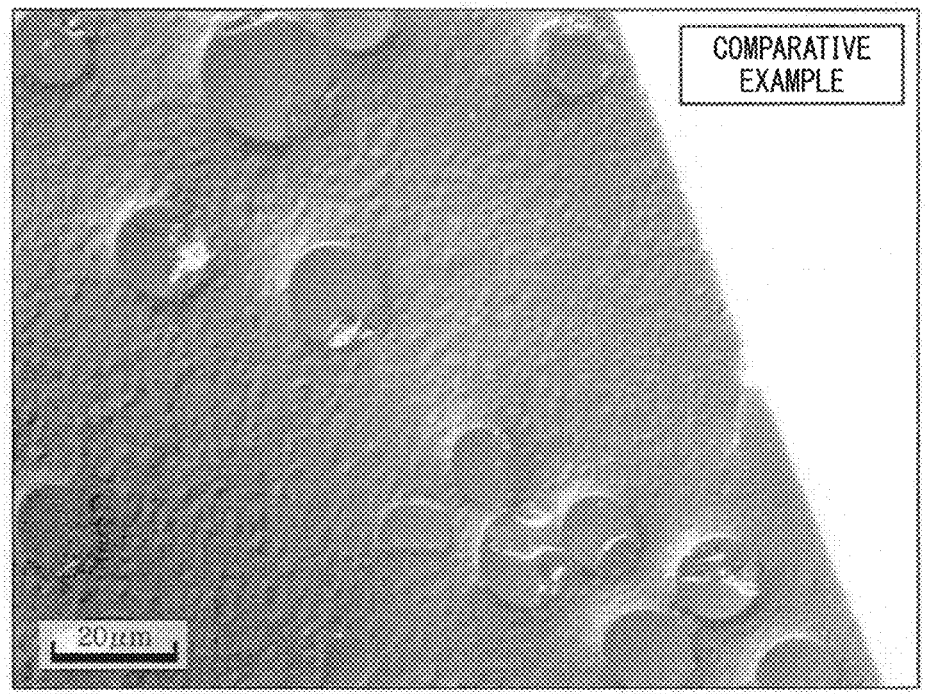
FIG. 8A is a photograph of the inner spherical surface of the accommodation section the housing in the comparative example observed through an electron microscope.
Figure 8B:
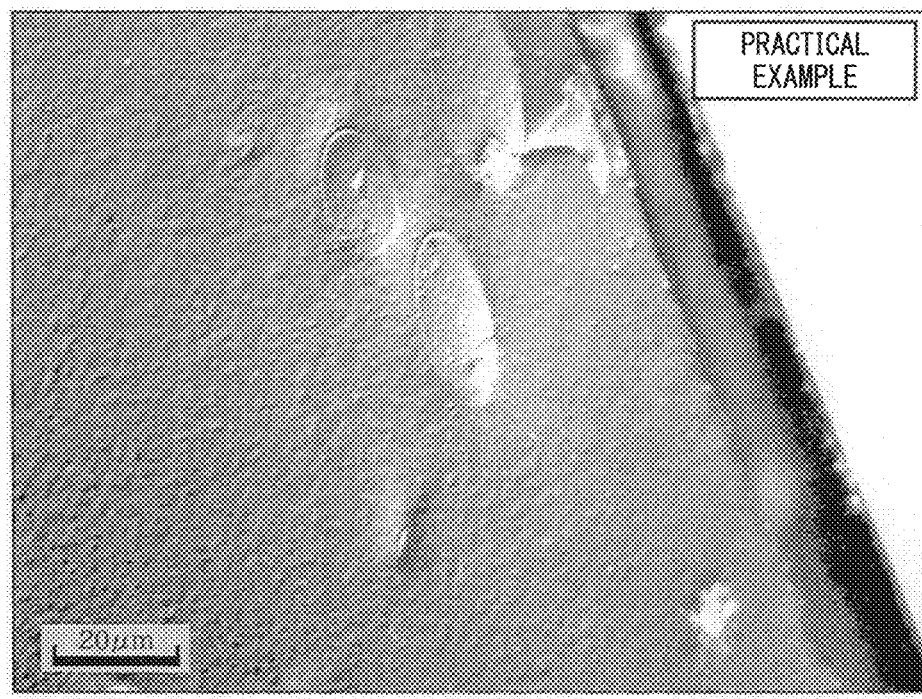
FIG. 8B is a photograph of the inner spherical surface of the accommodation section in the housing in the practical example observed through an electron microscope.

Also, with regard to the comparative example and the practical example, the inner spherical surface of the housing accommodation section 23a is directly observed using an electron microscope. The results are illustrated in FIG. 8A (the comparative example) and FIG. 8B (the practical example). FIG. 8A is a photograph of the inner spherical surface of the housing accommodation section 23a in the comparative example observed through an electron microscope. FIG. 8B is a photograph of the inner spherical surface of the housing accommodation section 23a in the practical example observed through an electron microscope. Also by observing the inner spherical surface of the housing accommodation section 23a through the electron microscope, it is demonstrated that the surface (the inner spherical surface of the housing accommodation section 23a) in the practical example in FIG. 8B (the plurality of number of times) is more smoothed than that in the comparative example in FIG. 8A (the single number of times).

According to the present inventors' research, it is conceivable that the smoothing of the inner spherical surface of the housing accommodation section 23a is associated with the crystallization of the resin material (PA66-GF30). Furthermore, a phenomenon in which glass fibers mixed in the resin material are settled (the exposure to the surface decreases) along with the crystallization of the resin material (PA66-GF30) is observed. This glass fiber sedimentation phenomenon is also conceivable to be involved in the smoothing of the inner spherical surface of the housing accommodation section 23a.

Figure 9A:
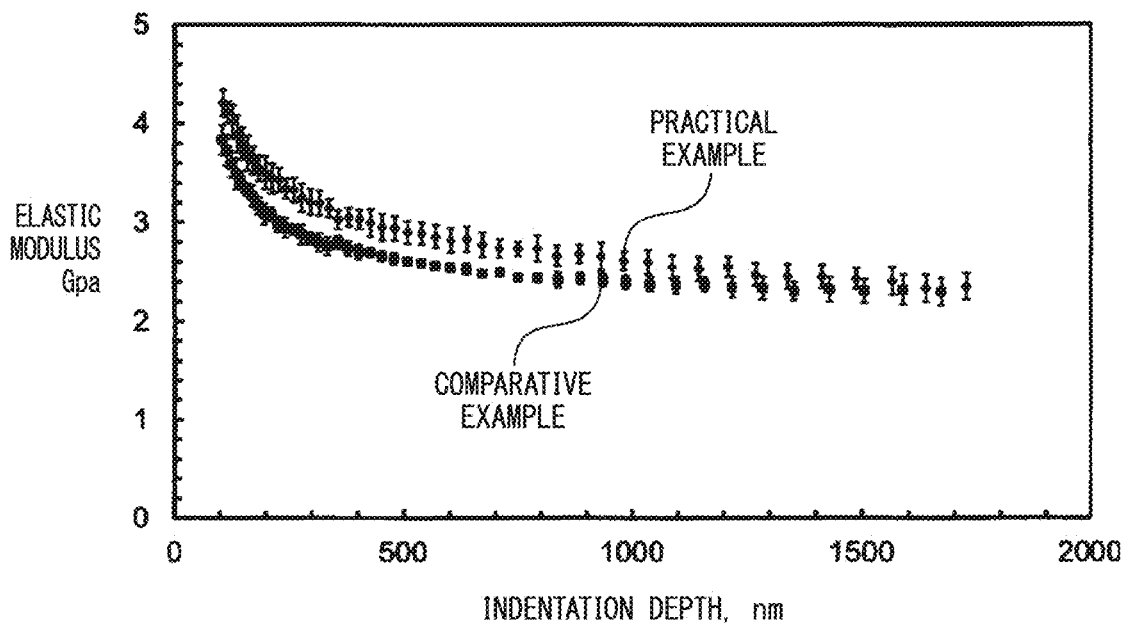
FIG. 9A is a characteristic diagram for describing a surface hardness of the inner spherical surface of the accommodation section in the housing in the comparative example when an indentation depth of an indenter is changed.
Figure 9B:
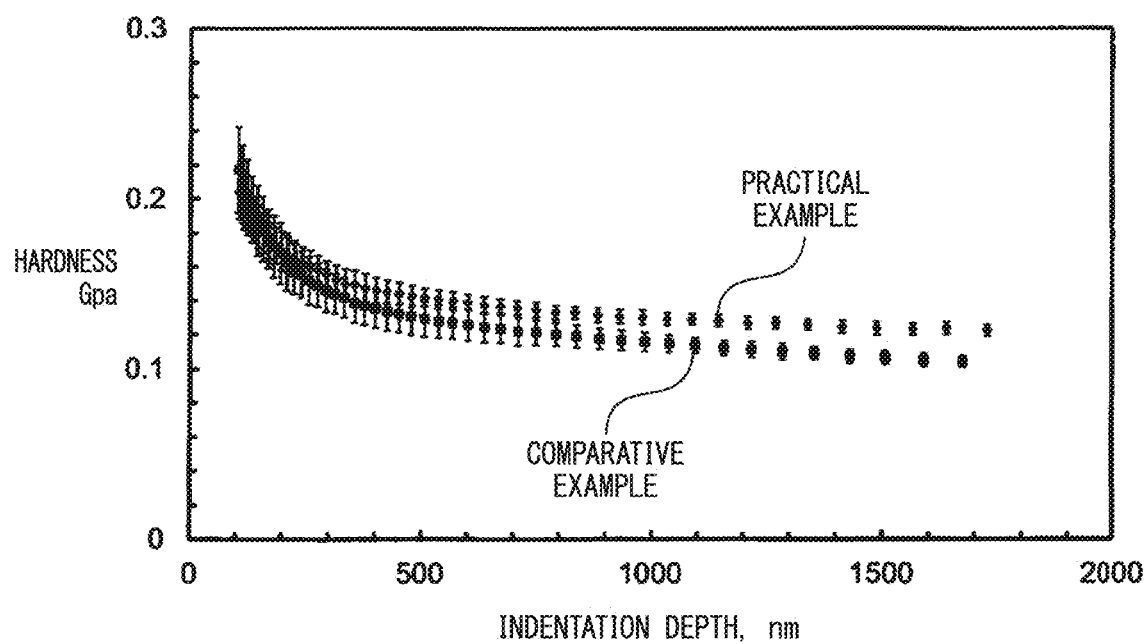
FIG. 9B is a characteristic diagram for describing a surface elastic modulus of the inner spherical surface of the accommodation section in the housing in the practical example when an indentation depth of an indenter is changed.

Furthermore, According to the present inventors' research, it can be seen that the hardness of the surface (the inner spherical surface of the housing accommodation section 23a) in the practical example (the plurality of number of times) is higher (that is, the wear resistance is improved) than that in the comparative example (the single of number of times). In order to prove this, the hardness (GPa) and an elastic modulus (GPa) of the inner spherical surface of the housing accommodation section 23a are measured using a nano-indentation method through a depth sensing indentation (DSI) method. A DSI method is a method for obtaining a hardness and an elastic modulus by continuously measuring an indentation depth during loading and unloading by pressing an indenter provided in a nano-indenter device (not shown) against a measurement object and using the obtained load-indentation depth characteristics without directly observing indentation of the indenter. FIG. 9A is a characteristic diagram for describing a surface hardness of the inner spherical surface of the housing accommodation section 23a in the comparative example when an indentation depth of an indenter provided in the nano-indenter device is changed. FIG. 9B is a characteristic diagram for describing a surface elastic modulus of the inner spherical surface of the housing accommodation section 23a in the practical example when the indentation depth of the indenter is changed. According to the measurement results using the DSI method, as illustrated in FIGS. 9A and 9B, it is demonstrated that the hardness of the surface (the inner spherical surface of the housing accommodation section 23a) in the practical example (the plurality of number of times) is higher (that is, the wear resistance is improved) than that in the comparative example (the single number of times). It should be noted that the reason why the hardness of the inner spherical surface of the housing accommodation section 23a increases is conceivable to be associated with the crystallization of the resin material (PA66-GF30) as in the case of smoothing the inner spherical surface of the housing accommodation section 23a.

Other Embodiments

The plurality of embodiments which have been described above illustrate specific examples of the present invention. Therefore, the technical scope of the present invention is not limitedly interpreted by the above-mentioned embodiments. It is possible to realize the present invention in various forms without departing from the gist or main features thereof.

For example, although the ball joint 13 according to the embodiment of the present invention has been described with reference to an example in which the ball joint 13 is applied to the stabilizer link 11 of the vehicle, the present invention is not limited to this example. The ball joint 13 according to the embodiment of the present invention can be widely applied to structures or the like of joint portions of arms included in industrial robots and joint portions of arms included in industrial vehicles such as excavators and cranes.

DESCRIPTION OF REFERENCE SIGNS 11 stabilizer link
13 ball joint
15 suspension device (structure)
17 stabilizer (structure)
21 ball stud
21b ball section
23 housing
23a accommodation section

What is claimed is:

1. A ball joint manufacturing method for manufacturing a ball joint including a ball stud in which a substantially spherical metal ball section is provided at an end portion of a stud section and a housing formed of a resin material, the housing including an accommodation section rotatably accommodating the ball section of the ball stud, the method comprising:
   forming the housing to cover an outer periphery of the ball section by forming a cavity by inserting the ball section of the ball stud into a mold as a core and by performing injection molding by injecting the resin material that forms the housing into the cavity in the mold;
   an induction heating process of subjecting the ball section to induction heating until a temperature of the ball section reaches a predetermined target temperature within a range which exceeds a glass transition point of the resin material that forms the housing but does not exceed a melting point thereof in a state in which the ball section is accommodated in the accommodation section of the housing; and
   a cooling process of cooling the ball section which has been subjected to the induction heating until the temperature of the ball section reaches at least a temperature of the glass transition point or less of the resin material that forms the housing,
   wherein a torque adjustment includes the induction heating process and the cooling process being repeatedly performed, and
   wherein the torque adjustment includes rotating the ball section during both the induction heating process and the cooling process of cooling the ball section.

2. The ball joint manufacturing method according to claim 1, wherein a tightening torque of the housing with respect to the ball section is adjusted by increasing or decreasing the number of repetitions of the torque adjustment.

3. The ball joint manufacturing method according to claim 1, wherein, in the torque adjustment, a tightening torque of the housing with respect to the ball section is adjusted by rotating the ball stud around an axis of the ball stud and by increasing or decreasing a rotational speed of the ball stud in a range below an upper limit rotational speed set on the basis of a limit PV value of the resin material that forms the housing.

4. A stabilizer link manufacturing method for manufacturing a stabilizer link in which a ball joint is provided at each of both ends of a support bar, comprising:
   manufacturing the ball joint using the ball joint manufacturing method according to claim 1; and
   providing the ball joint at each of both ends of the support bar.

* * * * *